US009422203B2

(12) United States Patent
Waliwitiya (10) Patent No.: US 9,422,203 B2
(45) Date of Patent: Aug. 23, 2016

(54) COMPOSITIONS AND METHODS FOR REDUCING NITROGEN VOLATILIZATION OF UREA FERTILIZERS

(71) Applicant: Active AgriProducts Inc., Abbotsford (CA)

(72) Inventor: Ranil Waliwitiya, Surrey (CA)

(73) Assignee: ACTIVE AGRIPRODUCTS INC., Abbotsford (CA)

( * ) Notice: Subject to any disclaimer, the term of this patent is extended or adjusted under 35 U.S.C. 154(b) by 0 days.

(21) Appl. No.: 14/697,286

(22) Filed: Apr. 27, 2015

(65) Prior Publication Data

US 2016/0159707 A1   Jun. 9, 2016

Related U.S. Application Data

(60) Provisional application No. 62/087,618, filed on Dec. 4, 2014.

(51) Int. Cl.
| | |
|---|---|
| C05G 3/08 | (2006.01) |
| C05C 9/00 | (2006.01) |
| C05G 3/00 | (2006.01) |
| C05C 1/02 | (2006.01) |
| C05B 7/00 | (2006.01) |
| C09K 15/30 | (2006.01) |
| C09K 15/34 | (2006.01) |

(52) U.S. Cl.
CPC ... C05G 3/08 (2013.01); C05B 7/00 (2013.01); C05C 1/02 (2013.01); C05C 9/00 (2013.01); C05G 3/0041 (2013.01); C09K 15/30 (2013.01); C09K 15/34 (2013.01)

(58) Field of Classification Search
CPC .......... C05G 3/08; C05G 3/0041; C05B 7/00; C05C 1/02; C05C 9/00; C09K 15/30; C09K 15/34

See application file for complete search history.

(56) References Cited

U.S. PATENT DOCUMENTS

| | | | |
|---|---|---|---|
| 4,581,056 A * | 4/1986 | Nooden | C05F 11/10 504/136 |
| 5,352,265 A | 10/1994 | Weston | |
| 5,698,003 A | 12/1997 | Omilinsky | |
| 8,888,886 B1 | 11/2014 | Whitehurst | |
| 2011/0113842 A1 | 5/2011 | Urrutia | |
| 2014/0037570 A1 | 2/2014 | Whitehurst | |
| 2014/0047883 A1 | 2/2014 | Gabrielson | |
| 2014/0060132 A1 | 3/2014 | Roberts | |
| 2014/0090432 A1 | 4/2014 | McKnight | |

(Continued)

FOREIGN PATENT DOCUMENTS

| | | |
|---|---|---|
| CA | 2881465 A1 | 2/2014 |
| WO | 2010/096266 A1 | 8/2010 |

(Continued)

OTHER PUBLICATIONS

Austrade, "Sunflower Lecitin" http://www.austradeinc.com/sunflowerlecithin/ (2008).*

*Primary Examiner* — Jennifer A Smith
(74) *Attorney, Agent, or Firm* — Oyen Wiggs Green & Mutala LLP (57) ABSTRACT

A nitrogen stabilizing composition is provided. The composition includes 10% to 18% w/w N-(n-butyl) thiophosphoric triamide (NBPT), a solvent, a light oil, and an emulsifier. Related methods for making liquid nitrogen stabilizing compositions, coated urea fertilizers and liquid urea fertilizer solutions are also provided.

8 Claims, 4 Drawing Sheets

| PRODUCT | Ammonia level (ppm) | | | | | |
|---|---|---|---|---|---|---|
| | 0 | 24hrs | 48hrs | 72hrs | 96hrs | 120hrs |
| Control | 0 | 600 | 1000 | 1000 | 1000 | 1000 |
| N-hibit | 0 | 45 | 90 | 100 | 100 | 100 |
| Arborite | 0 | 400 | 500 | 800 | 800 | 800 |
| Agrotain | 0 | 50 | 100 | 110 | 110 | 110 |

N-hibit over Agrotain:

| PRODUCT | % of Nitrogen saved by N-hibit | | | | | |
|---|---|---|---|---|---|---|
| | 0 | 24hrs | 48hrs | 72hrs | 96hrs | 120hrs |
| N-hibit | 0 | 11 | 11 | 10 | 10 | 10 |

(56) References Cited

U.S. PATENT DOCUMENTS

2015/0218060 A1\* 8/2015 Hayes ............... C05G 3/08
  71/28
2015/0299061 A1\* 10/2015 Catto ............... C05C 9/005
  504/241

FOREIGN PATENT DOCUMENTS

| WO | 2013/090287 A1 | 6/2013 |
| WO | 2013/121384 A2 | 8/2013 |
| WO | 2014080352 A1 | 5/2014 |

\* cited by examiner

| PRODUCT | Ammonia level (ppm) | | | | | |
|---|---|---|---|---|---|---|
| | 0 | 24hrs | 48hrs | 72hrs | 96hrs | 120hrs |
| Control | 0 | 600 | 1000 | 1000 | 1000 | 1000 |
| N-hibit | 0 | 45 | 90 | 100 | 100 | 100 |
| Arborite | 0 | 400 | 500 | 800 | 800 | 800 |
| Agrotain | 0 | 50 | 100 | 110 | 110 | 110 |

Fig. 1A

N-hibit over Agrotain:

| PRODUCT | % of Nitrogen saved by N-hibit | | | | | |
|---|---|---|---|---|---|---|
| | 0 | 24hrs | 48hrs | 72hrs | 96hrs | 120hrs |
| N-hibit | 0 | 11 | 11 | 10 | 10 | 10 |

Fig. 1B

N-hibit over Arborite:

| PRODUCT | % of Nitrogen saved by N-hibit | | | | | |
|---|---|---|---|---|---|---|
| | 0 | 24hrs | 48hrs | 72hrs | 96hrs | 120hrs |
| Arborite | 0 | 789 | 456 | 700 | 700 | 700 |

| PRODUCT | Ammonia level (ppm) | | | % control |
|---|---|---|---|---|
| | 14 days | 21 days | 28 days | |
| Control | 420 | 640 | 800 | 0 |
| N-hibit | 0 | 40 | 60 | 92.5 |
| Arborite | 0 | 70 | 120 | 85 |
| Agrotain | 0 | 40 | 70 | 91.25 |

| PRODUCT | Ammonia level (ppm) | | | | | % control at day 10 |
|---|---|---|---|---|---|---|
| | 1 day | 2 days | 5 days | 7 days | 10 days | |
| Control | 290 | 550 | 1000 | 1000 | 1000 | 0 |
| N-hibit-1L/1000L | 120 | 200 | 290 | 310 | 310 | 69 |
| N-hibit-1.5L/1000L | 120 | 200 | 290 | 310 | 310 | 69 |
| Arborite | 120 | 340 | 460 | 510 | 510 | 49 |
| Agrotain | 150 | 220 | 290 | 320 | 320 | 68 |

COMPOSITIONS AND METHODS FOR REDUCING NITROGEN VOLATILIZATION OF UREA FERTILIZERS

FIELD OF THE INVENTION

This invention relates to compositions and methods for reducing nitrogen volatilization of urea fertilizers used in agriculture.

BACKGROUND

Urea fertilizer is commonly used as a source of nitrogen in agriculture. Urea is degraded by the enzyme urease, an enzyme that is ubiquitous in agricultural systems. Urease degradation of urea results in the loss of nitrogen from soil as ammonia in a process called volatilization. Different approaches have been implemented to prevent nitrogen loss from volatilization, including the use of the urease inhibitor N-(n-butyl) thiophosphoric triamide (NBPT). Liquid formulations containing NBPT for use in reducing nitrogen volatilization comprise are known, and for example are sold under the trademarks AGROTAIN™ and ARBORITE™. Efficient and cost-effective compositions and methods for reducing nitrogen volatilization of urea fertilizers are desirable.

SUMMARY

The invention described herein has many aspects.

One aspect provides a nitrogen stabilizing composition comprising: 10% to 18% w/w N-(n-butyl) thiophosphoric triamide (NBPT); a solvent; a light oil; and an emulsifier.

The composition may comprise 1% to 5% w/w of the light oil, and the light oil may be vegetable oil.

The composition may comprise 1% to 5% w/w of the emulsifier, and the emulsifier may be sunflower lecithin.

The composition may comprise 1% to 5% w/w of a surfactant, and the surfactant may be polysorbate 20.

The solvent may be N-methyl-2-pyrrolidone (NMP), propylene glycol and/or ethylene glycol. The composition may comprise 30% to 40% w/w of the NMP, 20% to 30% w/w of the propylene glycol and 20% to 30% w/w of the ethylene glycol.

The composition may be water-free.

The pH of the composition may be pH 6.5 to 7.5.

The composition may comprise 10% to 15% NBPT.

The composition may be provided in a ready-to-use form or a concentrated form. The concentrated form may be selected from the group consisting of a liquid, gel, and reconstitutable powder.

Another aspect provides a method for making a liquid nitrogen stabilizing composition comprising:
(a) dissolving N-(n-butyl) thiophosphoric triamide (NBPT) in a solvent comprising N-methyl-2-pyrrolidone (NMP), propylene glycol and ethylene glycol; and
(b) adding a vegetable oil and an emulsifier to the mixture from step (a),
wherein final concentrations of components in the composition are:
10% to 15% w/w NBPT;
1% to 5% w/w vegetable oil; and
1% to 5% w/w emulsifier.

The vegetable oil may be canola oil. The emulsifier may be sunflower lecithin.

The method may further comprise:
(c) adding a surfactant to the mixture of step (b), wherein a final concentration of the surfactant is 1% to 5% w/w.

The surfactant may be polysorbate 20.

Another aspect provides a method of making a coated urea fertilizer comprising:
(a) making a liquid nitrogen stabilizing composition according to the method described above;
(b) blending the composition with urea granules at a ratio of 1 L/1000 kg to 3 L/1000 kg.

The method may comprise:
(c) adding an additional fertilizer to the mixture of step (b), wherein the additional fertilizer comprises phosphorus, potassium and/or sulfur.

Another aspect provides a method of fertilizing soil comprising applying to the soil to be fertilized a coated urea fertilizer according to the invention. The coated urea fertilizer may be applied at a rate of 50 to 500 pounds per acre, or 100 to 150 pounds per acre.

Another aspect provides a method of making a liquid urea fertilizer solution comprising:
(a) making a liquid nitrogen stabilizing composition according to the method described above;
(b) mixing the composition with a urea-ammonium nitrate (UAN) solution, or an ammonium-polyphosphate (APP) solution at a ratio of 0.5 L/1000 L to 3.0 L/1000 L.

Another aspect provides a method of fertilizing soil comprising applying to the soil to be fertilized a liquid urea fertilizer according to the invention. The liquid urea fertilizer may be applied at a rate of 0.5 L to 1.5 L/acre or about 1 L/acre.

BRIEF DESCRIPTION OF DRAWINGS

The accompanying drawings illustrate non-limiting example embodiments of the invention.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, a value % w/w means the weight percent of a component of the composition with respect to the total weight of said composition.

Known liquid formulations of NBPT for use in reducing nitrogen volatilization such as those commercially available under the trademarks AGROTAIN™ and ARBORITE™ comprise approximately 24% of NBPT by total weight of solution. Since NBPT is a solid compound, coating NBPT onto urea requires NBPT to be introduced into a liquid carrier prior to being mixed with urea. Accordingly, the greater the amount of NBPT used in a particular formulation, the greater amount of solvent required, and both factors increase costs.

The inventor has determined that NBPT in known liquid formulations such as the AGROTAIN™ and ARBORITE™ formulations precipitates at room temperature over time. The inventor has also determined that known liquid formulations of NBPT such as the AGROTAIN™ and ARBORITE™ formulations form undesirable dust particulates comprising NBPT. The inventor has further determined that the dust particulates (i) adhere and cake to components of the mixing machinery during blending of the formulations with urea to coat the urea, as well as to components of the applicator machinery during application of the coated urea to soil, thereby reducing the availability of NBPT for coating and inhibiting even coating of the urea.

One aspect relates to an oil-based liquid nitrogen stabilizing composition comprising 10% to 18% w/w of NBPT, a solvent, a light oil and an emulsifier. In some embodiments the composition comprises 10% to 15% NBPT. Light oils include vegetable oils, essential oils, light mineral oils, light animal oils and similar substances. Light oils can be contrasted to heavy oils, which include lubricating oils, fuel oil, gas oil, kerosene and similar substances. In some embodiments the composition is free of any heavy oils. In some embodiments the light oil may be a vegetable oil. In some embodiments, vegetable oil may be the only oil in the composition.

In some embodiments, the vegetable oil and emulsifier each make up 1% to 5% w/w of the composition. In some embodiments the composition may also comprise 1% to 5% w/w of a surfactant. In some embodiments, the pH of the composition is pH 6.5 to pH 7.5. In some embodiments, the pH of the composition is less than pH 7. In some embodiments the composition may include water, a colouring agent and/or a stabilizer. In some embodiments, the composition is water-free.

In some embodiments, the solvent may, for example, be selected from one or more of a pyrrolidone (e.g. N-methyl pyrrolidone (NMP)), an alkylene or polyalkylene glycol (e.g. ethylene glycol, propylene glycol, and butylene glycol), glycerin, dimethyl sulfoxide, an alkanolamine (e.g. ethanolamine, diethanolamine, dipropanolamine, methyl diethanolamine, monoisopropanolamine and triethanolamine) and/or an alkyl lactate (e.g. ethyl lactate, propyl lactate, and butyl lactate). In some embodiments the solvent is a combination of 30% to 40% w/w of the NMP, 20% to 30% w/w of the propylene glycol and 20% to 30% w/w of the ethylene glycol.

In some embodiments, the emulsifiers may, for example, be selected from one or more of monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, diacetylated tartaric acid esters of monoglycerides, lecithins, lysolecithins, succinic acid esters of mono- and/or diglycerides, lactic acid esters of mono- and/or diglycerides, lecithins, lysolecitins, and sucrose esters of fatty acids, lecithin (e.g. soy lecithin, canola lecithin, sunflower lecithin, and/or safflower lecithin), and lysolecithins. In some embodiments the emulsifier is sunflower lecithin, a product that is commercially available under the trademark TOPCITHIN™.

In some embodiments, the surfactant may, for example, be selected from one or more of polysorbate 20 (TWEEN™ 20), polysorbate 40 (TWEEN™ 40), polysorbate 60 (TWEEN™ 60) and polysorbate 80 (TWEEN™ 80). In some embodiments the surfactant is polysorbate 20 (TWEEN™ 20).

In some embodiments, the vegetable oils may, for example, be selected from one or more of canola oil, corn oil, rapeseed oil, cottonseed oil, soybean oil and sunflower oil. In some embodiments the vegetable oil is canola oil.

In some embodiments, the stabilizers may, for example, be selected from one or more of xanthan gum, carageenan, maltodextrin, pectin, inulin, starch, gelatin and agar. In some embodiments the stabilizer is xanthan gum.

In some embodiments, the colouring agent may, for example, be selected from blue, purple and green dyes. In some embodiments the colouring agent is a blue dye.

In some embodiments, the compositions described herein can be provided in concentrate form (e.g., liquid, gel, or reconstitutable powder form), suitable for further dilution and/or mixing in water or other suitable diluent prior to application. In some embodiments, the compositions disclosed and described herein can be provided as a ready-to-use solution for direct application. In some embodiments, the compositions described herein can be combined with other fertilizer solutions, and thus are formulated to be diluted and/or reconstituted by mixing with such other solutions.

Unexpected and surprising properties of the compositions of the present invention compared to commercially available formulations such as AGROTAIN™ and ARBORITE™ include: (i) inhibition of dust formation, resulting in less caking on mixing machinery and applicator machinery and greater availability of NBPT; (ii) NBPT staying in solution indefinitely; (iii) lower viscosity, allowing enhanced and even spreading of the resulting liquid composition on urea; (iv) lower freezing point, allowing use and easier handling in winter conditions; and (v) less adherence to metal components of the mixing machinery and applicator machinery.

Another aspect relates to methods for making a liquid nitrogen stabilizing composition. In some embodiments the method includes dissolving N-(n-butyl) thiophosphoric triamide (NBPT) in a solvent comprising N-methyl-2-pyrrolidone (NMP), propylene glycol and ethylene glycol, followed by adding a vegetable oil and an emulsifier to the mixture of NBPT and solvents. In some embodiments the final concentrations of components in the composition are 10% to 15% w/w NBPT, 1% to 5% w/w vegetable oil, and 1% to 5% w/w emulsifier. In some embodiments the vegetable oil is canola oil. In some embodiments the emulsifier is sunflower lecithin.

In some embodiments the method includes adding surfactant to the mixture of NBPT, solvents, vegetable oil and emulsifier. In some embodiments the final concentration of the surfactant is 1% to 5% w/w. In some embodiments the surfactant is polysorbate 20.

Another aspect relates to methods for making a coated urea fertilizer. In some embodiments the method includes making a liquid nitrogen stabilizing composition as described herein, followed by blending the composition with urea granules at a ratio of 1 L/1000 kg to 3 L/1000 kg. In some embodiments, the additional fertilizer may be added to the mixture of the composition and urea granules. In some embodiments, the additional fertilizer may be added to the composition before blending with the urea granules. In some embodiments, the additional fertilizer may include a source of phosphorus, potassium and/or sulfur.

Another aspect relates to methods for fertilizing soil. In some embodiments the method includes applying to soil to be fertilized a coated urea fertilizer as described herein. In some embodiments the application rate of the coated urea fertilizer may be 50 to 500 pounds per acre, or 100 to 150 pounds per acre.

Another aspect relates to methods for making a liquid urea fertilizer solution. In some embodiments the method includes making a liquid nitrogen stabilizing composition as described herein, followed by mixing the composition with a urea-ammonium nitrate (UAN) solution, or an ammonium-polyphosphate (APP) solution at a ratio range of 0.5 L/1000 L to 3.0 L/1000 L, or 1.0 L/1000 L to 1.5 L/1000 L. UAN solutions containing 28%, 30% and 32% of nitrogen are commercially available and other customized concentrations and formulations can be obtained. Ammonium-polyphosphate solutions containing about 34% to about 37% phosphorus pentoxide are commercially available, and other customized concentrations and formulations can be obtained.

Another aspect relates to methods for fertilizing soil. In some embodiments the method includes applying to soil to be fertilized a liquid urea fertilizer solution as described herein. In some embodiments the application rate may be 0.5 to 1.5 L/acre, or about 1 L/acre.

This application is intended to cover any variations, uses, or adaptations of the invention using its general principles. Further, this application is intended to cover such departures from the present disclosures as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

EXAMPLES

The invention can be further understood by reference to the following examples, which are provided by way of illustration and are not meant to be limiting.

In the following examples, an embodiment referred to by the inventor as ArmU has the following formulation. (The embodiment referred to as ArmU was previously referred to by the inventor as N-hibit. All references to N-hibit in the Figures are references to ArmU.)

| | |
|---|---|
| 30% | N-methyl-2-pyrrolidone (NMP) |
| 25% | propylene glycol |
| 25% | ethylene glycol |
| 15% | N-(n-butyl) thiophosphoric triamide (NBPT) |
| 2.5% | water |
| 2% | TOPCITHIN ™ sunflower lecithin |
| 2% | TWEEN ™ 20 polysorbate surfactant |
| 1% | canola oil |
| 0.3% | blue dye |
| 0.2% | xanthan gum |

The pH of the ArmU formulation used in the following examples was pH 6.8. This formulation was found to be stable at room temperature for at least 30 months with no precipitation of NBPT.

In the following examples, the ARBORITE™ and AGROTAIN™ products contained approximately 24% NBPT by weight of solution. These known commercial products therefore contained approximately 60% greater the concentration of NBPT compared to ArmU.

Experiment 1

Figure 1A:
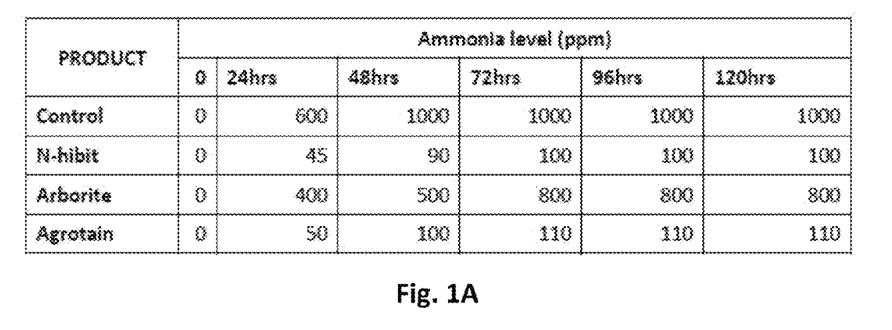
FIG. 1A is a table showing the effects on ammonia emissions of coated urea containing a composition according to an embodiment and two known commercial compositions at 24, 48, 72, 96 and 120 hours after treatment.
Figure 1B:
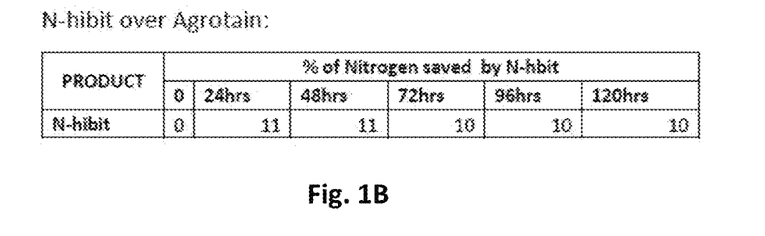
FIG. 1B is a table comparing the effects on ammonia emissions of coated urea containing a composition according to an embodiment and coated urea containing the known commercial composition AGROTAIN™ at 24, 48, 72, 96 and 120 hours after treatment, with results showing in the form of ratios, expressed as percentages.
Figure 1C:
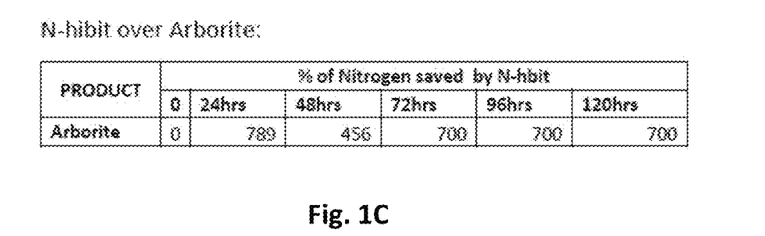
FIG. 1C is a table comparing the effects on ammonia emissions of coated urea containing a composition according to an embodiment and coated urea containing the known commercial composition ARBORITE™ at 24, 48, 72, 96 and 120 hours after treatment, with results showing in the form of ratios, expressed as percentages.

Experiment 1 tested ammonia emissions from samples of urea granules coated with ArmU, ARBORITE™ or AGROTAIN™. The control sample was uncoated urea, and the three test samples were: (i) urea coated with 3 L/1000 kg of ArmU, (ii) urea coated with 3 L/1000 kg of ARBORITE™, and (iii) urea coated with 3 L/1000 kg of AGROTAIN™. The samples were placed in clear plastic jars with lids. A hole was pierced in each lid for the purpose of inserting an ammonia measuring tube into the jar, and any openings formed from the piercing around the tube were sealed with soft clay. The results are shown in FIGS. 1(a), 1(b) and (c). Levels of emitted ammonia were measured in parts per million (ppm) at 24 h, 48 h, 72 h, 96 h and 120 h after treatment, as shown in FIG. 1(a). Urea coated with ArmU showed significantly lower levels of ammonia emitted compared to the uncoated control sample and the urea coated with ARBORITE™. Urea coated with ArmU showed similar if not slightly lower levels of ammonia emitted compared to urea coated with AGROTAIN™. FIGS. 1(b) and 1(c) show the ratios at 24 h, 48 h, 72 h, 96 h and 120 h, of ammonia emitted from urea coated with AGROTAIN™ and ARBORITE™, respectively, over ammonia emitted from urea coated with ArmU, measured, expressed as percentages.

Experiment 2

Figure 2A:
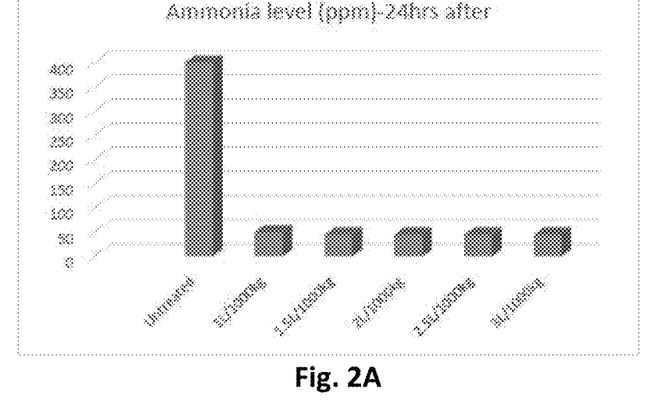
FIGS. 2A to 2C are graphs showing ammonia emissions of urea granules treated with a composition according to an embodiment at: 24 hours after treatment in FIG. 2A, 48 hours after treatment in FIG. 2B, and 72 hours after treatment in FIG. 2C.
Figure 2B:
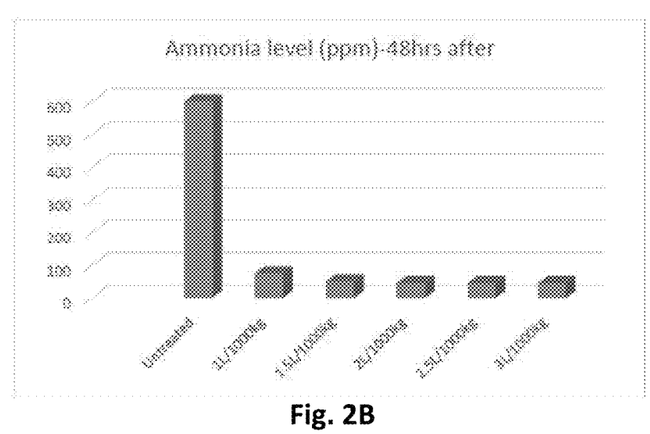
Figure 2C:
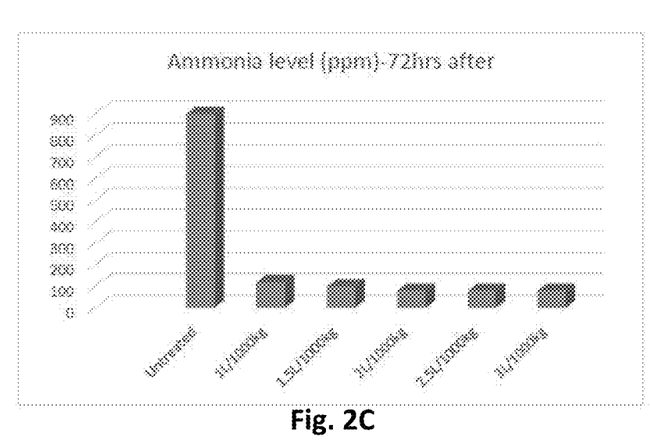

Experiment 2 tested ammonia emissions from samples of urea granules coated with ArmU at different application rates. The control sample was uncoated urea, and the five test samples were ArmU applied to urea at the following application rates: 1 L/1000 kg, 1.5 L/1000 kg, 2 L/1000 kg, 2.5 L/1000 kg and 3 L/1000 kg. The samples were placed in clear plastic jars with lids. A hole was pierced in each lid for the purpose of inserting an ammonia measuring tube into the jar, and any openings formed from the piercing around the tube were sealed with soft clay. FIGS. 2(a), 2(b) and 2(c) display results at 24 h, 48 h and 72 h respectively. All five test samples showed significantly lower levels of ammonia emitted compared to uncoated urea. Lower levels of ammonia were emitted from urea coated with 2 L/1000 kg, 2.5 L/1000 kg and 3 L/1000 kg of ArmU compared to urea coated with 1 L/1000 kg and 1.5 L/1000 kg of ArmU. Ammonia volatilization levels did not change as the application rate of ArmU was increased from 2 L/1000 kg to 3 L/1000 kg across the three points.

Experiment 3

Figure 3A:
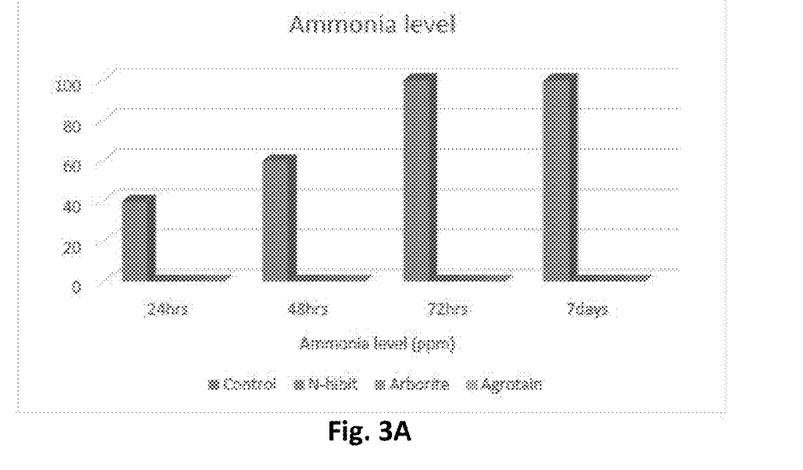
FIG. 3A is a graph showing the effects on ammonia emissions of coated urea that is mixed with topsoil containing a composition according to an embodiment and two known commercial compositions at 24, 48, 72 hours and 7 days after treatment.
Figure 3B:
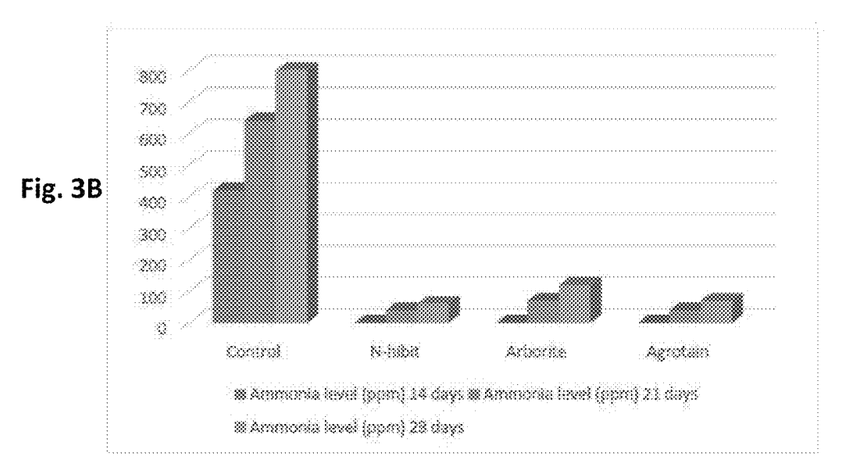
FIG. 3B is a graph showing same at 14, 21 and 28 days after treatment.
Figure 3C:
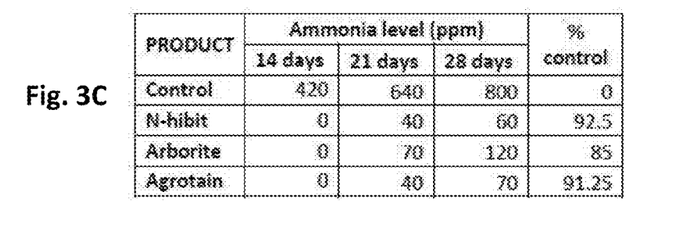
FIG. 3C is a table showing the data of FIG. 3B in tabular form.

Experiment 3 tested ammonia emissions from samples of urea granules coated with ArmU, ARBORITE™ or AGRO- TAIN™, and mixed with soil. The soil was topsoil collected from a home garden. The topsoil was dried and sieved to remove rocks and other debris. The control sample was uncoated urea, and the three test samples were (i) ArmU applied at 2 L/1000 kg, (ii) ARBORITE™ applied at 3 L/1000 kg and (iii) AGROTAIN™ applied at 3 L/1000 kg. The samples were placed in clear plastic jars. 200 grams of topsoil were then subsequently added into each jar, and the jars were closed with lids. A hole was pierced in each lid for inserting an ammonia measuring tube into the jar, and any openings formed from the piercing around the tube were sealed with soft clay. FIG. 3(a) shows the amounts of ammonia emitted at 24 h, 48 h, 72 h and 7 days after treatment. Coated urea showed significantly lower levels of ammonia emitted compared to the control, and coated urea containing any of the three compositions showed similar levels of ammonia emitted. FIG. 3(b) shows the amounts of ammonia emitted at 14, 21 and 28 days after treatment. Urea coated with ArmU and AGROTAIN™ showed similar levels of ammonia emitted. Lower amounts of ammonia were emitted from urea coated with ArmU and AGROTAIN™ compared to urea coated with ARBORITE™.

Experiment 4

Figure 4A:
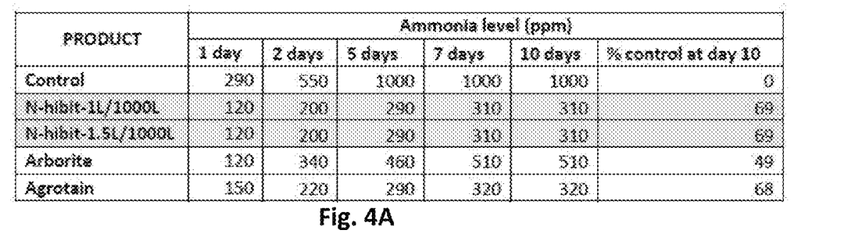
FIG. 4A is a table showing the effects on ammonia emissions of coated urea-ammonium nitrate (UAN) solution (28-0-0) containing a composition according to an embodiment and two known commercial compositions at 1, 2, 5, 7 and 10 days after treatment.
Figure 4B:
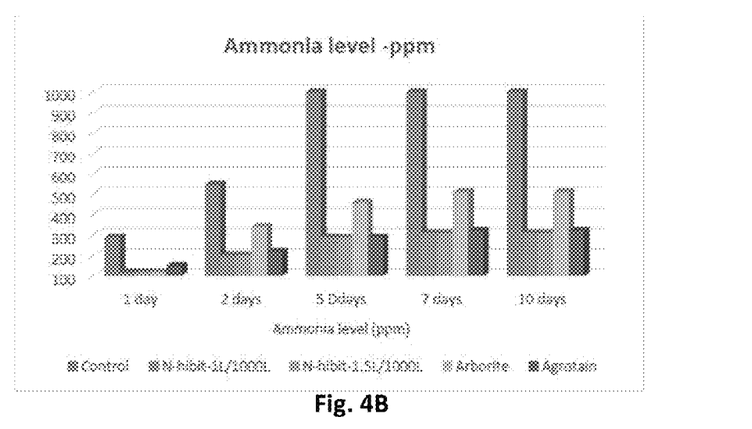
FIG. 4B is a graph showing the data of FIG. 4A in graphic form.

Experiment 4 tested ammonia emissions from samples of urea-ammonium nitrate (UAN) solution (28-0-0) combined with ArmU, ARBORITE™ or AGROTAIN™ as an additive. The control sample was UAN with no additive, and the four test samples were UAN with 1 L/1000 L of ArmU, 1.5 L/1000 L of ArmU, 1.5 L/1000 L of ARBORITE™ and 1.5 L/1000 L of AGROTAIN™. The samples were placed in clear plastic jars with lids. A hole was pierced in each lid for inserting an ammonia measuring tube into the jar, and any openings formed from the piercing around the tube were sealed with soft clay. FIG. 4 shows ammonia emissions from the control and test samples at 1, 2, 5, 7, and 10 days after treatment. UAN containing ArmU and AGROTAIN™ emitted similarly low levels of ammonia, and were lower than ammonia emissions from UAN containing ARBORITE™.

Experiment 5

Experiment 5 was a field trial that tested the mixability and flowability of urea granules coated with ArmU. The field trial was conducted on a commercial scale, in Miniota, Manitoba, Canada. The temperature during the field trial was about −11° C. at a relative humidity of about 78%. The ArmU composition had a uniform appearance without any precipitates even at −11° C. ArmU was poured onto a moving belt carrying urea granules at an application rate of 2 L/1000 kg. The moving belt was set at a speed of 17 mph. The urea granules with ArmU applied was transferred to a vertical screw blender. No buildup of dust was visible in the screw blender during and after blending. After four minutes of blending, ArmU uniformly coated the urea. A fertilizer blend comprising sulfur, nitrogen, phosphate, and potash at a 90-30-30-25 was subsequently added at a 2:1 ratio of fertilizer blend to coated urea granules, to obtain a final fertilizer product.

The fertilizer was then applied to a total of 205 acres of land at a rate of 351 pounds per acre of land (therefore 117 pounds of coated urea per acre of land) using an Ag Chem Air Assist Floater applicator. After transferring 25 tonnes of the fertilizer, there was minimal to no buildup of dust on the auger. The fertilizer was applied to 100 acres of land, and then to 200 acres of land. The fertilizer created no build-up of dust on the applicator component after each application. The minimal to no buildup of dust during ArmU transfer and application is in contrast to significantly greater dust buildup on the mixing, transfer and applicator machinery when fertilizers comprising commercially available NBPT formulations such as AGROTAIN™ and ARBORITE™ were used under similar conditions.

Experiment 6

Experiment 6 tested the viscosities of ArmU, AGROTAIN™ and ARBORITE™. Samples were analyzed for viscosity at 20° C. with a shear rate of 105 s$^{-1}$ using a rheometer. The results are shown in Table 1 below. ArmU has significantly lower viscosity than AGROTAIN™ and ARBORITE™.

TABLE 1

Viscosity of ArmU and commercial NBPT formulations

| Sample | Viscosity (cP) |
|---|---|
| ArmU | 12.8 |
| AGROTAIN | 26.1 |
| ARBORITE | 86.7 |

Experiment 7

Experiment 7 tested the freezing points of ArmU, AGROTAIN™ and ARBORITE™. Samples were analyzed cryostat methodologies well known in the art. The results are shown in Table 2 below. ArmU has a significantly lower freezing point than AGROTAIN™ and ARBORITE™.

TABLE 2

Freezing points of ArmU and commercial NBPT formulations

| Sample | Freezing point (° C.) |
|---|---|
| ArmU | −66 |
| AGROTAIN | −43 |
| ARBORITE | −34 |

The invention claimed is:

1. A nitrogen stabilizing composition comprising:
    10% to 18% w/w N-(n-butyl) thiophosphoric triamide (NBPT);
    a solvent comprising N-methyl-2-pyrrolidone (NMP), propylene glycol and ethylene glycol;
    1% to 5% w/w vegetable oil; and
    1% to 5% sunflower lecithin.

2. A composition according to claim 1, comprising 30% to 40% w/w of the NMP, 20% to 30% w/w of the propylene glycol and 20% to 30% w/w of the ethylene glycol.

3. A composition according to claim 2 wherein the composition is water-free.

4. A method for making a liquid nitrogen stabilizing composition comprising:
    (a) dissolving N-(n-butyl) thiophosphoric triamide (NBPT) in a solvent comprising N-methyl-2-pyrrolidone (NMP), propylene glycol and ethylene glycol; and
    (b) adding a vegetable oil and an emulsifier to the mixture from step (a), wherein final concentrations of components in the composition are:
    10% to 18% w/w NBPT;
    1% to 5% w/w vegetable oil; and
    1% to 5% w/w emulsifier.

5. A method according to claim 4 wherein the vegetable oil is canola oil.

6. A method according to claim 4 wherein the emulsifier is sunflower lecithin.

7. A method according to claim 4 further comprising:
   (c) adding a surfactant to the mixture of step (b), wherein a final concentration of the surfactant is 1% to 5% w/w.

8. A method according to claim 7 wherein the surfactant is polysorbate 20.

\* \* \* \* \*